(12) United States Patent
Liu et al.

(10) Patent No.: US 10,939,375 B2
(45) Date of Patent: Mar. 2, 2021

(54) COMMUNICATIONS MODULE FOR TECHNOLOGY ASSET CONNECTIVITY

(71) Applicant: ThingsMatrix, Inc., Austin, TX (US)

(72) Inventors: Huitao Liu, Marietta, GA (US); Lei Yao, Austin, TX (US)

(73) Assignee: ThingsMatrix, Inc., Austin, TX (US)

( * ) Notice: Subject to any disclaimer, the term of this patent is extended or adjusted under 35 U.S.C. 154(b) by 0 days.

(21) Appl. No.: 16/455,889

(22) Filed: Jun. 28, 2019

(65) Prior Publication Data

US 2020/0413337 A1 Dec. 31, 2020

(51) Int. Cl.
*H04W 52/02* (2009.01)
*G01S 19/34* (2010.01)
*H04W 24/10* (2009.01)
*H04W 52/38* (2009.01)

(52) U.S. Cl.
CPC ......... *H04W 52/0229* (2013.01); *G01S 19/34* (2013.01); *H04W 24/10* (2013.01); *H04W 52/38* (2013.01)

(58) Field of Classification Search
CPC ......... H04W 52/0209; H04W 52/0216; H04W 52/0251; H04W 52/0258; H04W 52/0261; H04W 52/0274; H04W 52/028; H04W 84/18; Y02D 70/21; Y02D 70/22; Y02D 30/70

See application file for complete search history.

(56) References Cited

U.S. PATENT DOCUMENTS

2014/0120843 A1* 5/2014 Yamaji .............. H04W 52/0209
  455/67.11
2018/0295583 A1* 10/2018 Cornwall .......... H04W 52/0258
2019/0188997 A1* 6/2019 Gilson .................... H04Q 9/00

* cited by examiner

*Primary Examiner* — Pao Sinkantarakorn
(74) *Attorney, Agent, or Firm* — Jerry C. Liu

(57) ABSTRACT

A wireless communication module of a technology asset device is operable to derive power from a power source without instruction by the technology asset device to direct power flow from the power source to the wireless communication module. The wireless communication module can connect to a wireless network and receive from an asset management system an instruction regarding a responsive action to be performed by the wireless communication device that relates to a condition.

24 Claims, 11 Drawing Sheets

COMMUNICATIONS MODULE FOR TECHNOLOGY ASSET CONNECTIVITY

TECHNICAL FIELD

The present application relates generally to the field of wireless communication and, more specifically, to a communications module for technology assets, such as Internet of Things (IoT) devices.

BACKGROUND

With the growth of cellular technology, including the upcoming 5G network and beyond, the mobile networking infrastructure is expected to facilitate fulfillment of the demand for exponentially increasing data traffic for a variety of use cases, including communications by internet of things (IoT) and industrial internet of things (IIoT) devices.

The Internet of things (IoT) is a term used to describe the implementation of Internet connectivity (e.g., via a wireless communication network) in physical devices, including appliances, everyday objects, and industrial devices. IoT devices, which can be embedded with sensors and Internet connectivity, can communicate and interact with other devices over the Internet, and can also be remotely monitored and controlled. As applied to the consumer market, IoT technology is most often described with respect to "smart home" products, such as appliances (e.g., lighting fixtures, thermostats, home security systems and cameras, and other home appliances) that can be monitored remotely, or controlled by devices such as smartphones. Furthermore, the industrial internet of things (IIoT), considered a subset of IoT, is a term used to describe the various sets of hardware components that work together through IoT connectivity to facilitate various industries, such as manufacturing, industrial processes, power delivery, etc. Such devices can include connected sensors and meters. IoT and IIoT technology can bring together a variety of devices, machines, networks, and people through mobile communications and networking technologies. Intelligent networks and systems can be developed that can monitor, gather, analyze, and deliver data useful for managing such consumer devices and industrial networks.

The above-described background relating to IoT technology is merely intended to provide a contextual overview of some current issues and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
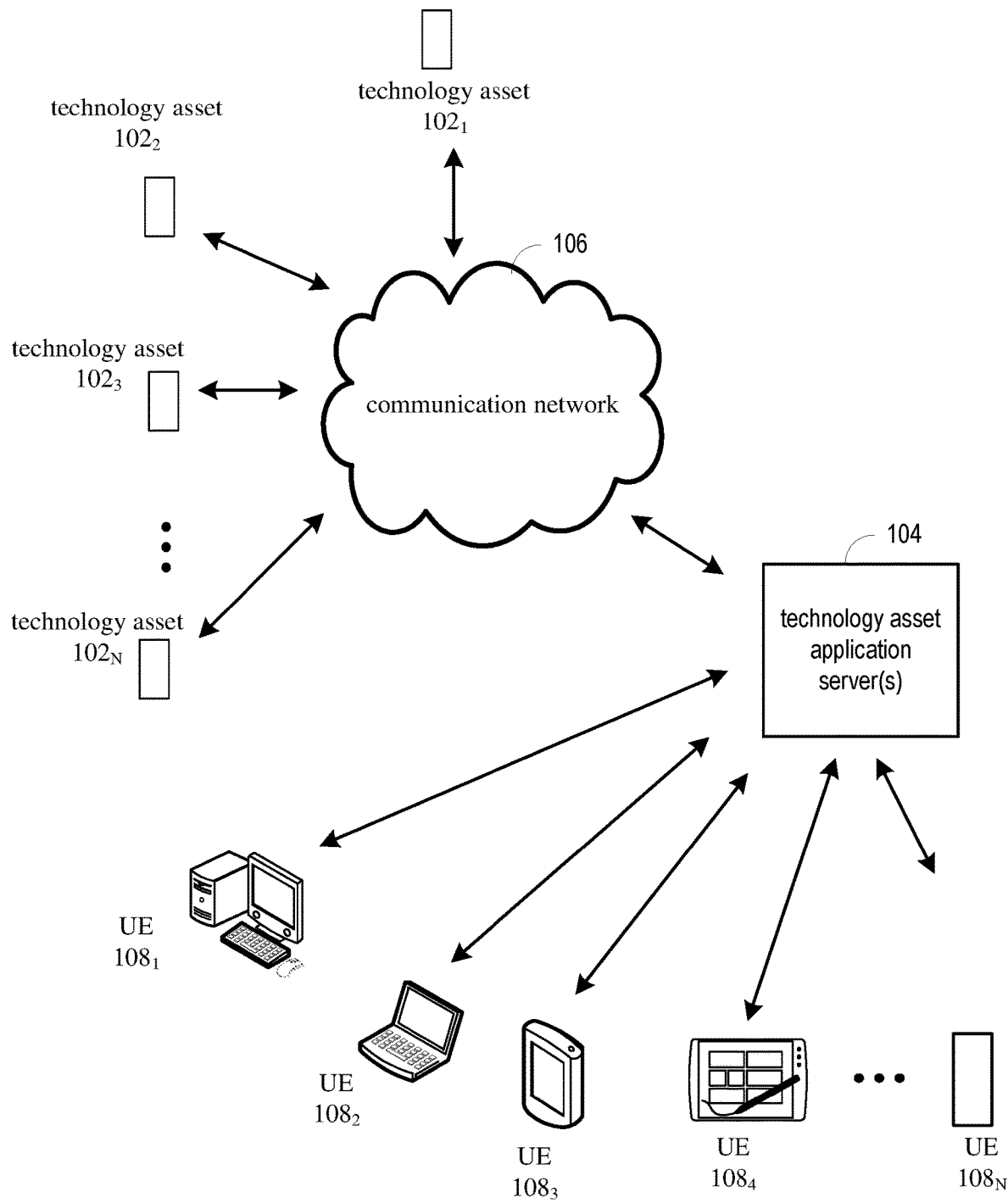
FIG. 1 illustrates an example of technology asset devices that communicate via a communication network with a technology asset application server, in accordance with various aspects and example embodiments of the subject application.

The subject disclosure is now described with reference to the drawings, wherein like reference numerals are used to refer to like elements throughout. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings. In the following description, for purposes of explanation, numerous specific details are set forth in order to provide a more thorough understanding of the subject disclosure. It may be evident, however, that the subject disclosure can be practiced without these specific details. In other instances, structures and devices are shown in block diagram form to facilitate describing the subject disclosure.

The methods and operations (e.g., processes and logic flows) described in this specification can be performed by devices (e.g., network management device, gateway device, etc.) comprising programmable processors that execute machine executable instructions (e.g., computer program product, computer-readable instructions, software, software programs, software applications, software modules, etc.) to facilitate performance of the operations described herein. Examples of such devices can be devices comprising circuitry and components as described in FIG. 2, FIG. 3, and FIG. 11.

Today, both consumers and enterprises have in their networks an increasing number of valuable technology assets with electronic components, including IoT devices (e.g., a smart home appliance in a home, a phasor measurement unit (PMU) in an electrical grid, wireless-enabled cameras in a security system, temperature sensors on a farm, etc.). The value of the technology asset can be measured by its functions (such as performed by home appliances and office and industrial equipment), or by the information stored in the technology asset (such as stored in an IoT device, or as stored in personal or enterprise computing equipment). It is preferred that the technology asset owner entities, or the entities that manage such technology assets, are able to communicate with and manage the technology asset remotely (configure, locate, lockdown, enable, or disable), or when the asset is misplaced, lost, or stolen.

The solutions deployed today enable remote management by using wireless communications technology. Typically, such solutions include built-in wireless radio modules (wireless communication modules) of the technology asset to provide the capability to connect to the Internet, or an enterprise backend server, which makes them reachable remotely for the owner or management entity. Such remote management can facilitate location tracking (GPS or IP address) and remote wipe on smart phones and computing devices equipped with cellular broadband radio modules.

However, there are limitations with the current solutions. The wireless radio module is controlled by the technology asset's local operating system (or some other application run by the technology asset), and the wireless radio module is powered by the technology asset's power source, which is also under the control of the technology asset's operating system (or some other application run by the technology asset). The wireless radio module is just a mere component that is controlled by the technology asset to enable data transmission.

In all cases, the availability of the technology asset for remote management becomes dependent on the technology asset being connected (reachable) utilizing the built-in wireless radio module. This connection, however, is dependent on the technology asset being powered on, and dependent on the local operating system of the technology asset to direct power to the wireless radio module so that it can receive communications. As a result, the entity having physical possession of the technology asset (e.g., personnel can turn the device on and off), and the technology asset's control of the power on/off of the technology asset, determines whether the asset is remotely reachable and manageable. As an example, if the asset is powered off, then the built-in wireless radio module is powered off and the IoT device will lose connectivity, and the technology asset owner loses remote management capability.

In the case of IoT and IIoT technology assets, many of the IoT devices (sensors in light bulbs, appliances, etc.) that will be deployed, including in IIoT environments, will not always be in an active state in which they can respond to communications. Such IoT devices might operate off of energy drawn from a battery, or might draw very low amounts of power from the electric utility grid on a periodic basis. An IoT device, such as a current sensor having a wireless radio module, might be timed to wake up (e.g., turn on, or go into an active state) every hour to respond to any inquiring servers when it is in the active state. When the IoT application server seeks information from the IoT device, the IoT application server can send a transmission to the IoT device to determine if it is active ("ping" the IoT device to see if it responds with an acknowledgement, which would indicate that it is active and ready to communicate). When the IoT device reaches an active state, the IoT device will acknowledge in the affirmative, and then the IoT application server can send a request for the electric current reading that was measured, and the current sensor IoT device will respond accordingly, by transmitting its electric current reading. In other typical implementations, an IoT device might not be pinged, but the IoT device might be on a timer to go from an inactive (or low power) state to an active state, and once in the active state, engage its wireless radio module to transmit its data to an application server. In either case, whether the IoT device is reachable by another device, such as an IoT application server, the IoT device must be in an active power state, and direct some power to a wireless radio module to enable it to receive transmissions. If the IoT device is not in an active power state, then the wireless radio module is not turned on, and the IoT device is unable to receive transmissions. As such, the wireless radio module is dependent on the IoT device's operating system or power management system, to receive its power.

The present application relates to a wireless communication module of a technology asset (also referred to as technology asset device), wherein the technology asset can be, for example, an IoT device (e.g., which can be a monitoring device that can sense, read, take photos or video, capture data, etc.). In example embodiments, the wireless communication module can operate independently of the technology asset's operating system. In example embodiments, the wireless communication module can be always connected to a wireless network, or it can connect with the wireless network based on conditions that arise, the parameters of which can include a scheduled time, a threshold battery level, or some other triggered event arising in the technology asset. The wireless communication module enables reporting of measurements, as well as the remote management of the technology asset, even when the technology asset's operating system does not control or direct power flow to the wireless communication module.

As such, example embodiment systems and methods accomplish the remote monitoring and management of the technology asset without dependency on the technology asset device's power on/off status and end user operation of the monitoring device. It enables the owner of the technology asset to remotely manage the technology asset, such as locate the technology asset, set up geo-fencing alerts, and take responsive actions with respect to the monitoring device, including but not limited to, power on/off, reset, read, write, lock, wipe memory.

FIG. 1 shows a diagram in which technology assets $102_{1-N}$ (which can be referred to in the singular as technology asset 102, and can also be referred to in the plural as technology assets 102) can communicate with one or more technology asset application servers 104 (also referred to as technology asset application server devices, which can also be referred to in the singular as technology asset application server 104, and in the plural as technology asset application servers 104). The technology assets 102 can communicate with the technology servers 104 via a communication network 106, in accordance with example embodiments of the present application. While example embodiments depicted may relate to IoT devices, other computing devices, such as IIoT devices, user equipment, and the like, can also be considered technology assets.

In the example embodiments in which the technology assets 102 comprise IoT devices, the IoT devices can communicate with one or more technology asset application servers 104 (e.g., IoT application servers) through the communication network 106.

The IoT device can comprise, for example, a connected consumer device such as a smart home product (e.g., smart appliances, heaters, air conditioning devices, lighting fixtures, thermostats, home security systems, cameras, and other user premise equipment). IoT devices can also comprise, for example, connected speakers, toys, and wearable devices. IoT devices can also comprise smart city technologies such as traffic monitoring and control devices, weather monitoring devices, and public security systems (e.g., smart surveillance). IoT devices can also comprise connected devices associated with cars, automobiles, boats, etc. IOT (and IIoT) devices can comprise connected sensing devices used in manufacturing, as well as connected sensors and meters used in various utilities (e.g., power, water, gas). IoT devices can also comprise connected devices used in smart farming (e.g., sensors that measure soil moisture and nutrients, water control usage devices, custom fertilizer dispensers, etc.), IoT devices can also comprise connected devices used in smart retail (e.g., smart point of sale displays, beacons in isles, etc.). IoT devices can also comprise connected devices used in healthcare (e.g., bodily function measuring and biometric devices). The above mentioned IoT devices are mentioned as examples of IoT and IIoT devices, but other IoT and IIoT devices are contemplated and within the scope of die present application.

As mentioned, in example embodiments, the technology asset application servers can be IoT application servers. The IoT application servers can comprise a computing device, such as a network server device, running software enabling the computing device to perform server operations as described herein. IoT application servers can be programmed to facilitate the monitoring and control of IoT devices, and can also poll or obtain information from IoT devices, and can store the obtained information in one or more repositories connected to the IoT application servers for subsequent retrieval (e.g., retrieval at the request of a UE). IoT application server can receive messages from IoT devices, and can also receive messages (e.g., commands) from user equipment (UE $108_{1-N}$) such as connected computers, laptops, tablets, smartphones, and other communications-enabled devices (which can be referred to in the singular as UE 108, and can also be referred to in the plural as UEs 108). As examples, the IoT application servers can be programmed, provisioned, or configured by UEs, such as configured to poll IoT devices for information or data at specific times, or to monitor the IoT devices at specific intervals. Additionally, in example embodiments, IoT application servers can enable IoT and IIoT devices to be remotely monitored or controlled by UEs via IoT application servers. Data obtained by IoT application servers from IoT devices can also be accessed, including remotely, by UEs connected to the IoT application servers.

Communication network 106 can comprise, for example, mobile networks, such as cellular and Wi-Fi networks (Wi-Fi "hotspot" implemented by a mobile device, Wi-Fi network using wireline broadband as backhaul, etc.). The communication network 106 can also comprise, for example, fixed, wireline based networks (e.g., a fiber-based network, a Data Over Cable Interface Specification (DOCSIS) network, an asymmetric digital subscriber line (ADSL) network, the like).

In example embodiments, the communication network 106 can comprise one or more large-scale wireless communication networks (e.g., mobile networks and the transport networks) that spans various geographic areas, and comprise various additional devices and components (e.g., additional network devices, additional UEs, network server devices, etc.). The communication network 106 can comprise different networks operated by different multiple service operators (MSOs) and mobile network operator (MNO) entities. In the case of mobile networks, mobile networks can employ various cellular systems, technologies, and modulation schemes to facilitate wireless radio communications between devices (e.g., the UE 102 and the network node 104). While example embodiments might be described for 5G New Radio (NR) systems, the embodiments can be applicable to any radio access technology (RAT) or multi-RAT system. For example, the mobile network can be of any variety, and operate in accordance with standards, protocols (also referred to as schemes), and network architectures (e.g., global system for mobile communications (GSM), Universal Mobile Telecommunications Service (UMTS), General Packet Radio Service (GPRS), Long Term Evolution (LTE), fourth generation LTE (4G LTE), fifth generation LTE (5G or New Radio (NR)), Worldwide Interoperability for Microwave Access (WiMAX), and the like).

Figure 2:
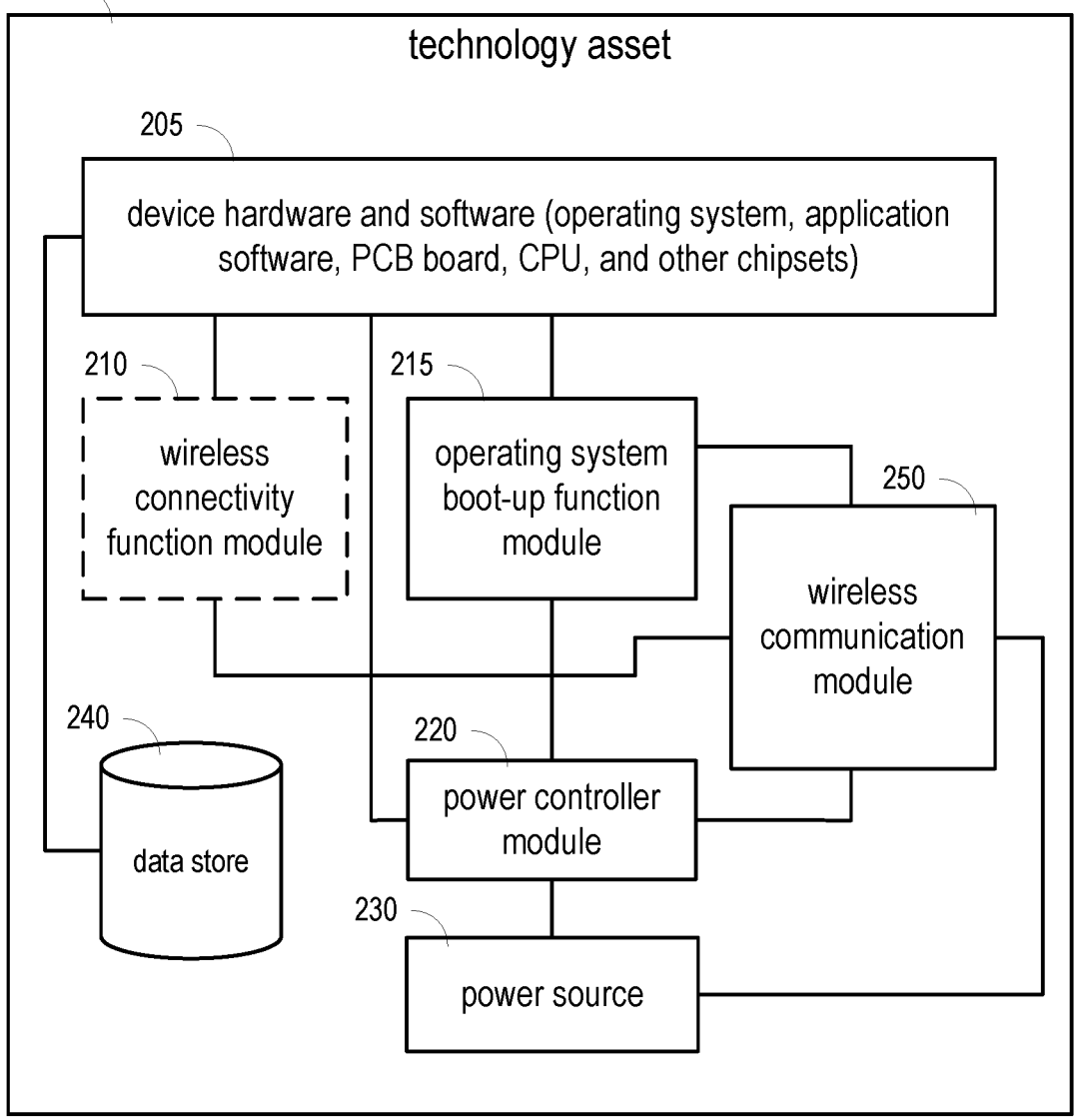
FIG. 2 illustrates a diagram of example components of a technology asset device, in accordance with various aspects and example embodiments of the subject application.

Moving to FIG. 2, in example embodiments, the technology asset 102 of the present application can comprise device hardware and software (represented by block 205) such as an operating system application software, printed circuit boards (PCB), memory, central processing unit (CPU), and a variety of chipsets. Shown separately for emphasis, the technology asset 102 can also comprise wireless connectivity function module 210 (which can be implemented as hardware, software, or some combination of both hardware and software), an operating system boot-up function module 215 (which can be implemented as hardware, software, or a combination of both hardware and software), a power controller module 220 (which can be implemented as hardware, software, or some combination of both hardware and software), a power source 230 (which can be, for example, one or more batteries, or a power supply unit that converts electricity from alternating current to direct current). The power source can serve as the power source of the wireless communication module 250, or the power source can serve as the power source of the technology asset 102. The technology asset 102 can also comprise a data store 240 (or repository) which can contain data derived from whatever condition the technology asset 102 might be tasked with monitoring (e.g., temperature measurements, electric current measurements, moisture readings, motion detection, location reading, etc.). The technology asset 102 can also comprise a wireless communication module 250, further details of which will be presented in FIG. 3. The wireless communication module 250 enables the technology asset 102 to communicate with, for example, a networked device such as an application server.

Still referring to FIG. 2, in example embodiments, the technology asset 102 can be in an inactive (e.g., low power, dormant, etc.) state in which it uses less power than it does in an active state. In this inactive state, the technology asset 102 might draw some power (e.g., a minimal amount of power to allow the device to perform some operations, or to keep information stored in non-volatile memory from being lost), but the power would not be directed to keep the wireless communication module 250 enabled, and as such, the device would be in a non-communicative state. The technology asset 102 might "wake up" at an programmed time (or time interval), which case the operating system boot-up function module 215 can send a command to the power controller module 220 to draw power from the power source 230 to more fully power the technology asset 102 to perform the functions that is tasked with. The power controller module 220 can also be commanded (e.g., by the operating system in block 205, the wireless connectivity function module 210, or the operating system boot-up function module 215) to direct power to the wireless communication module 250.

Figure 3:
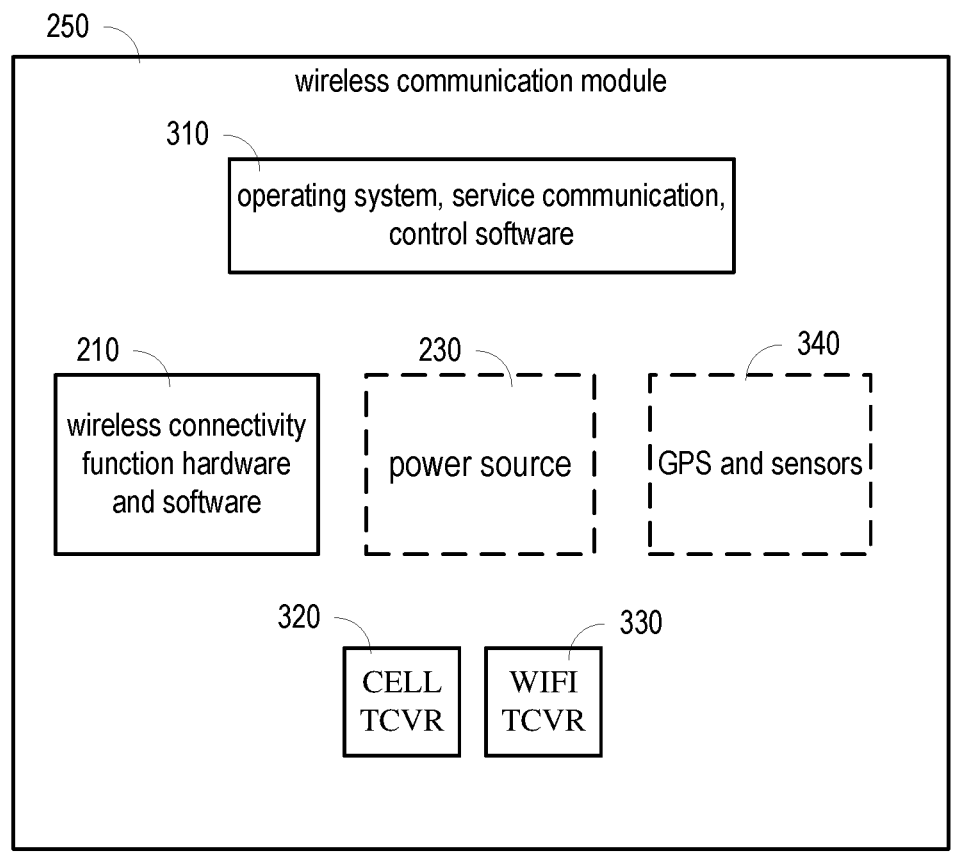
FIG. 3 illustrates a diagram of example components of a wireless communication module of the technology asset device, in accordance with various aspects and example embodiments of the subject application.

FIG. 3 depicts an illustration of some example components (e.g., one or more devices executing software to perform functions) of the wireless communication module 250, which enables bi-directional wireless communications between the technology asset 102 and networked devices (e.g., a remote management system, technology asset application server 104, etc.) based on implemented protocols.

The wireless communication module 250 can, in example embodiments, be installed in, or on, a circuit board of the technology asset 102. The wireless communication module 250 can comprise various hardware and software necessary for the wireless communication functions. The wireless communication module 250 can comprise the operating system, application software, service communication and control software, etc., represented in FIG. 3 by block 310. The wireless communication module 250 can also comprise radio frequency (RF) wireless transceivers, such as a wireless communication module cellular transceiver 320 and wireless communication module Wi-Fi transceiver 330. Other components can comprise various chipsets, universal integrated circuit card (UICC), global positioning system (GPS) and sensors 340, etc. One or more of the various chipsets (e.g., GPS and sensors 340) can be on the technology asset 102, but accessible for use by the wireless communication module 250. The power source 230, as mentioned above, can be that of the technology asset 102, or the wireless communication module 250 can have its own power source. Hardware and software can enable the wireless communication module 250 to communicate using schemes and protocols, for example, Short Messaging Service (SMS) and packet data, Wi-Fi, cellular (2G, 3G, Long Term Evolution (LTE), LTE category M1 (LTE-M), Narrowband-Internet of Things (NB-IoT), 5G, cellular vehicle to everything (C-V2X), low power wide area (LPWA), etc.

The wireless communication module 250, while in a low power or dormant state, can direct power from a power source to the wireless communication module 250 to establish a connection with a wireless network (e.g., communications network 106) based on a condition, such as time, battery life, an event, or some other event or condition detected by technology asset 102. The wireless communication module 250 can be integrated with the host system of the technology asset 102 (e.g., sensors tapped into the host system) to detect events or conditions on its own (e.g., without detection at the direction of the technology asset 102, and without power being directed to the wireless communication module 250 by the technology asset 102). An event or condition can be, for example, in the case of a vending machine, low temperature in the machine, or low inventory level in the machine. As another example, a C-V2X-enabled vehicle that wanders far from its established route —outside of its geofencing area—might trigger a connection to be made by the wireless communication module 250. In the case of PMUs, a power outage might trigger communications to be established. Even thought conditions related to the technology asset 102 might trigger the wireless communication module 250, the wireless communication module 250 nevertheless can draw power from the power source without power being directed to it by the technology asset 102.

In addition to a connection being established based on scheduled times or triggered events, the wireless communication module 250 can be in an "always connected" state, wherein the wireless communication module 250 can be connected to a wireless network (e.g., communications network 106 comprising a wireless network). For this to occur, unlike a typical device, the wireless communication module 250 of the present application can control and direct power flow from the power source 230 to the wireless communication module 250. In other example embodiments, the wireless communication module 250 can use its own power source. In either case, the wireless communication module 250 ability to draw power and be in a communication state need not depend upon the operating system (e.g., block 205, block 220, etc.) of the technology asset 120. As such, power flow to the wireless communication module 250 is not under control of the asset operating system and corresponding power management function. In example embodiments, the wireless communication module 250 integrates with and controls the power management function (e.g., power controller module 220) and/or initial boot up function (e.g., operating system boot-up function module 215) of the technology asset 102.

As additional functions, the wireless communication module can be used to authenticate the technology asset 102, either locally or remotely (e.g., by a network device such as a technology asset application server 104, or an asset management system as described below).

In addition to accessing GPS and sensors 340 that can reside on the circuit board of the technology asset 102, as described above, the wireless communication module 250 can also access electronic components of the technology asset 102 and execute commands with no dependency of the technology asset 102's local operating system. Such commands and actions may include, but are not limited to, communicating with a networked asset management system server, reporting measurements, reporting the status of the technology asset 102, stopping certain functions or completely stopping the functioning of the technology asset 102, powering on/off the technology asset 102, or wiping the memory of technology asset 102 (e.g., in response to a remote command, or based on the detection of a condition, such as the wireless communication module 250 being outside a geo-fenced area). With the technology asset 102 being in an active state, the wireless communication module 250 can also facilitate the display of messages on a built-in screen of the technology asset 102. Additionally, the wireless communication module 250 can facilitate the triggering of sound, or lights, with the technology asset 102 being in an active state, if those sound and light components exist on the technology asset 102.

In example embodiments, the wireless communication module 250 can aggregate and capture any data changes. For example, while measurements can be taken every minute by the technology asset 102, the wireless communication module can analyze the collected data and determine whether to transmit the data, so that the technology asset 102 does not need to transmit readings as frequently to a networked device. As an example, in the case of a technology asset 102 that is an environmental monitoring camera, the camera might capture images of a location every minute. Perhaps the camera is to monitor an area to determine whether an animal population crosses into the field of view of the camera. The captured images do not need not be transmitted every minute, in that the wireless communication module 250 can aggregate and store captured images in batches. The wireless communication module 250 can transmit a communication only when the image changes, for example when the said member of the animal population is captured. Additionally, image processing can change the resolution of the frames when deriving a change of one frame to the next, such as insignificant data can be filtered out, and only significant changes from frame to frame can be kept. This can reduce the amount of bandwidth and data in many applications related to weather, security, and other systems in which significant deviation of measurements can inform of a situation.

Figure 4:
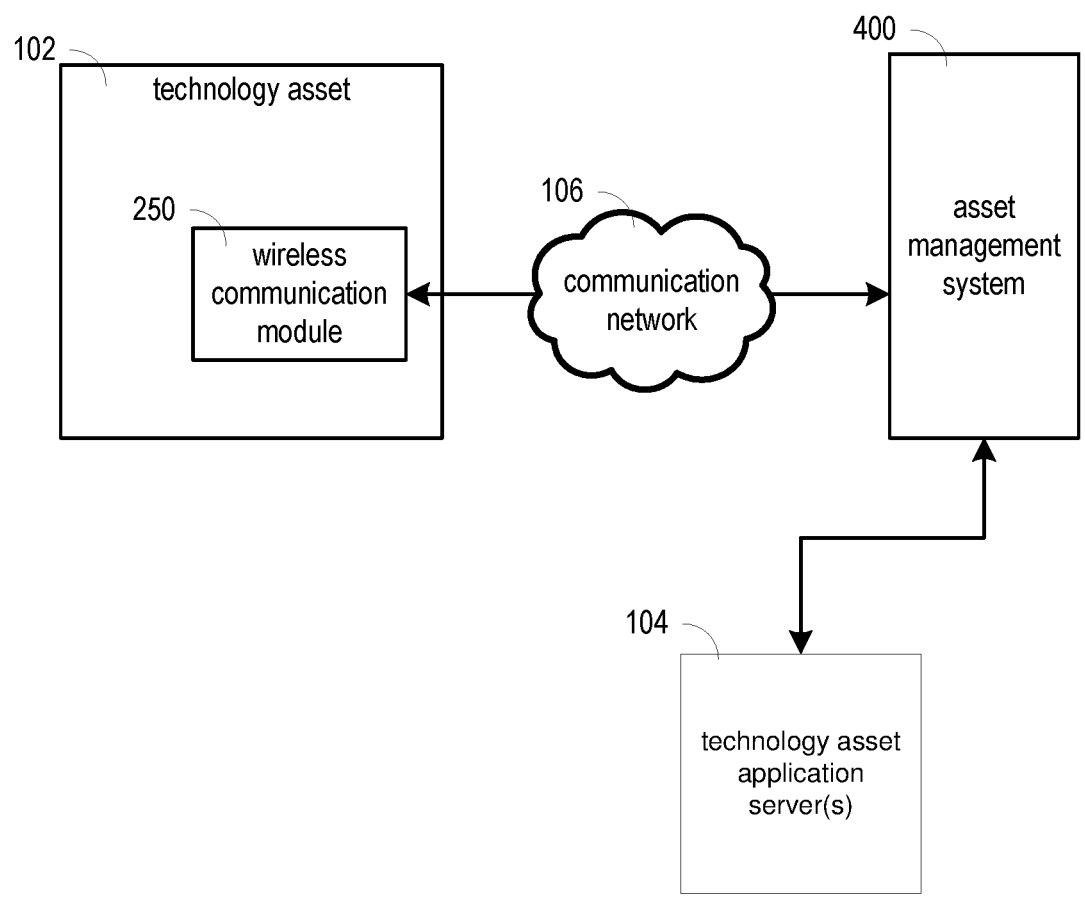
FIG. 4 illustrates a diagram depicting communications between a technology asset device and an asset management system, in accordance with various aspects and example embodiments of the subject application.

Moving now to FIG. 4, a network device comprising an asset management system 400 (comprised of one or more computing devices, such as servers) can be provided to communicate with the wireless communication module 250.

The asset management system 400 can define rules and policies to manage the asset remotely, execute the asset management actions, remotely communicate with the wireless communication module 250 to perform remote management functions, and can optimize communication with the wireless communication module 250 by aggregating and filtering data to minimize data usage and save battery on the technology asset 102. As an example, the asset management system 400 can filter and aggregate captured images in the same way as described above for the wireless communication module 250. Here, the asset management system 400 can have its own repository, and can collect data accessible by another server (e.g., technology asset application server 104). The file, software code, and protocol of the wireless communication module 250 and the asset management system 400 can be used to realize remote management functions. Since the wireless communication module 250 can be configured to be always powered on and always connected to the asset management system 400 through the available wireless network (e.g., communication network 106) regardless of the power on/off status of the technology asset 102, the asset management system 400 can communicate with the wireless communication module 250 to operate on the technology asset 102 remotely with no dependency on end user operation of the technology asset 102. Alternatively, the wireless connection can be scheduled based on parameters such as time, battery life, or triggered by some event in the technology asset 102 (host device on which the wireless communication module 250 is integrated), although the wireless communication module 250 would still be drawing power at its owner direction. This method allows management functions on the technology asset 102 to occur, such as locating the asset, setup of geo-fencing and alert, and taking actions including but not limited to, power on/off, reset, read, write, lock, wipe memory etc., via the wireless communication module 250.

By allowing data (e.g., aggregated and filtered data) to be stored with an accessible repository associated with the asset management system 400, and by allowing for the management functions as described above, a technology asset application server 104 can be freed to perform other functions more related to the functionality and purpose of the IoT device itself. For example, the primary purpose of an IoT based vending machine might be to periodically report the number of items bought and sold at the vending machine, not necessarily a power outage, or theft of the vending machine (e.g., taking it out of a geo-fenced area). An asset management system 400 that can remotely report on the location of a stolen vending machine removed outside of its geo-fenced location, or report on a power outage in the area in which the vending machine resides, frees the technology asset application server 104 to query the vending machine regarding its primary functions (e.g., querying the vending machine for the number of items sold, the total amount collected by the machine, times in which items were sold, etc.), leaving other functions related to emergencies, security, and other non-regular conditions to the asset management system 400.

Having described some of the components and functionality of the technology asset 102, the wireless communication module 250, and the asset management system 400, the following context provides examples of how the remote asset management system 400 works with the wireless communication module 250 as illustrative, nonlimiting examples.

Figure 5:
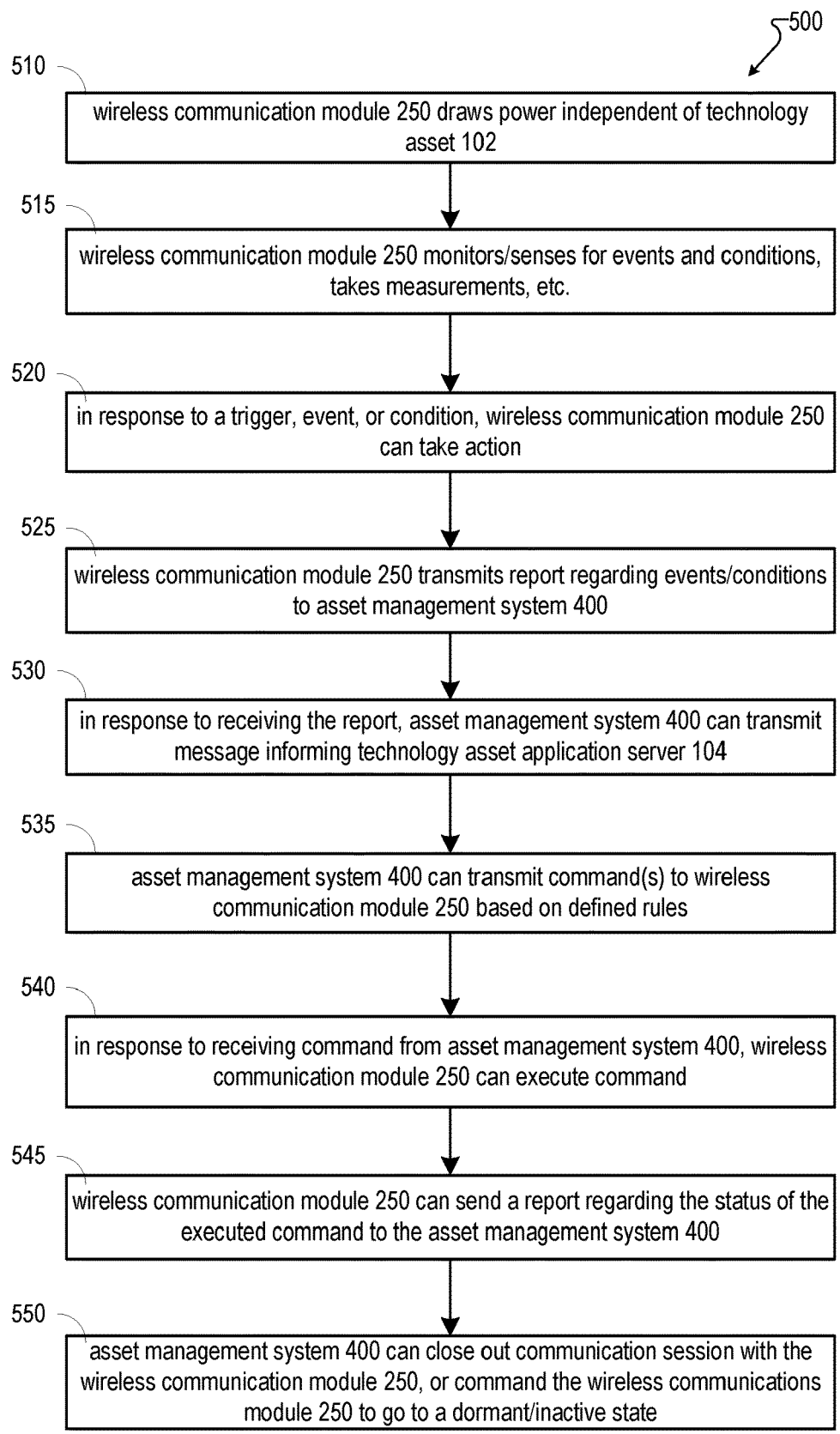
FIGS. 5-6 illustrate flow charts showing example operations that can be performed by the wireless communication module and the asset management system, in accordance with various aspects and example embodiments of the subject application.

Referring now to FIG. 5, a flow chart illustrates example embodiments wherein remote management functions are triggered by events that the wireless communication module 250 detects and acts upon. The wireless communication module 250 can be installed and integrated in (or integrated on) the technology asset 102. The wireless communication module 250 can operate independently of the technology asset 102, and can operate without being under the control of the technology asset 102's operating system and power management. As such, at block 510, the wireless communication module 250 can draw power from a power source (e.g., batteries, power supply unit, etc.) independent of the technology asset 102 (e.g., without the technology asset 102 directing power to the wireless communication module 250). The wireless communication module 250 can be configured with predefined trigger conditions/events including but not limited to geo-fencing, GPS location, temperature measurement. At block 515, the wireless communication module 250 can monitor or sense for events and conditions, and/or take measurements based on its built-in sensors and GPS receivers (e.g., GPS and sensors 340), or utilizing the built-in sensors or GPS receivers of the technology asset 102. The wireless communication module 250 can utilize the wireless connectivity provided by its own built-in wireless radio (e.g., comprising RF transceivers, Wi-Fi transceivers, etc.), and can implement a communication protocol to communicate with the asset management system 400. The communication can be in the form of, for example, periodic reports, reports based on triggering events and conditions, command and control of the technology asset 102 remotely, etc. At block 520, when the wireless communication module 250 detects an event is triggered or a condition is met, the wireless communication module 250 can take a responsive action(s) locally, if defined in the configuration file (e.g., configured to take action that has been defined). The actions can comprise stopping certain functions of the technology asset 102, completely stopping the functioning of the technology asset 102, powering on/off the technology asset 102, wipe the memory of technology asset 102, display messages on built-in screen of the technology asset 102, trigger sound and/or lights if the technology asset 102 is capable.

At block 525, instead of taking action locally, the wireless communication module 250 can communicate to the asset management system 400 the events/conditions (e.g., transmitting a report to the asset management system 400). At block 530, in response to receiving the report from the wireless communication module 250, the asset management system 400 can inform the owner of the asset of the events/conditions on the asset (e.g., transmit a reporting message to technology asset application server 104, or to a UE 108—operated by or on behalf of the owner entity). With or without instruction from the owner entity of the technology asset 102 (e.g., without instruction from a UE or technology asset application server 104 operated by or on behalf of the owner entity), the asset management system 400 can send commands to the wireless communication module 250 based on defined rules. At block 540, in response to receiving the command from the asset management system 400, the wireless communication module 250 can execute the command inside the technology asset 102 accordingly (e.g., taking some of the same responsive actions as mentioned above with respect to block 520). At block 545, the wireless communication module 250 can send a report of the responsive action status and/or completion of the responsive action to the asset management system 400. The bi-directional communication between wireless communication module 250 and asset management system 400 can remain active until the asset management system 400, at block 550, terminates the communication session, or restores the wireless communication module 250 to a dormant state (or periodic state) prior to the triggering event occurring again.

Figure 6:
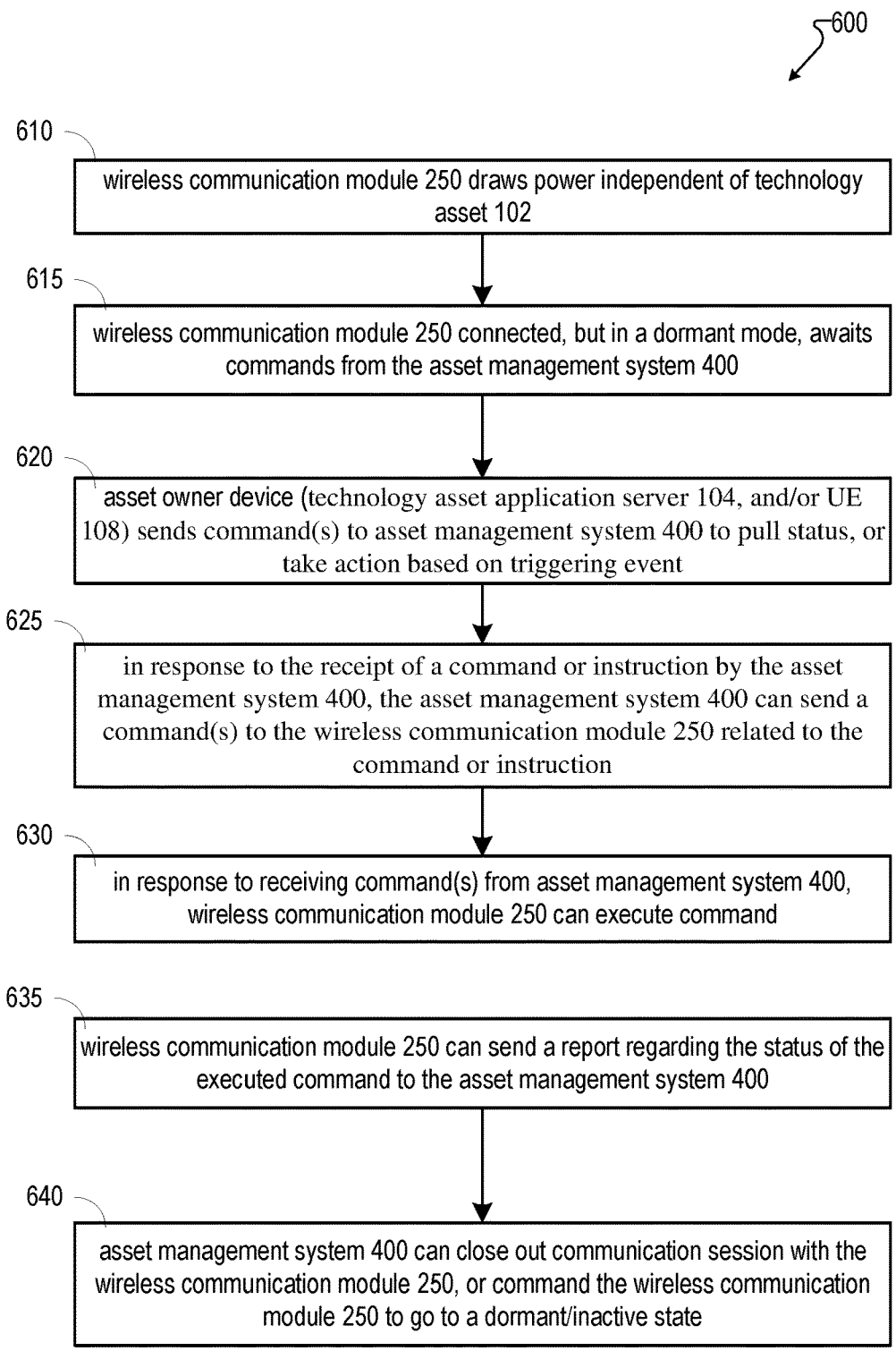

Referring now to FIG. 6, a flow chart illustrates example embodiments wherein remote management functions are triggered by an technology asset owner entity device (e.g., technology asset application server 104, or UE 108, either or both of which can be operated by or on behalf of the technology asset owner entity). The wireless communication module 250 can be installed and integrated in (or integrated on) the technology asset 102. The wireless communication module 250 can operate independently of the technology asset 102, and can operate without being under the control of the technology asset 102's operating system and power management. As such, at block 610, the wireless communication module 250 can draw power from a power source (e.g., batteries, power supply unit, etc.) independent of the technology asset 102. The wireless communication module 250 can utilize the wireless connectivity provided by its own built-in wireless radio, and the communication protocols implemented in the wireless communication module to communicate with the asset management system 400. At block 620, the wireless communication module 250, which can be configured to be always connected but in dormant mode, awaits commands from the asset management system 400.

At block 620, the asset owner can manage the asset by sending commands or instructions to the asset management system 400 (e.g., sends commands or requests using, for example, technology asset application server 104, and/or UE 108) to pull status, data, or other information from the technology asset 102, or to take action based on conditions or triggering events (such as the technology asset 102 being reported lost, maintenance service on the technology asset 102 being due, or other conditions as mentioned above). At block 625, in response to the receipt of a command or instruction by the asset management system 400 from the asset owner's device/system, the asset management system 400 can send a command(s) to the wireless communication module 250 related to the command or instruction related to the triggering event.

At block 630, in response to receiving the command from the asset management system 400, the wireless communication module 250 can execute the command inside the technology asset 102. At block 635, the wireless communication module 250 can send a report of the action status and/or completion to the asset management system 400. The bi-directional communication between wireless communication module 250 and asset management system 400 can remain active until the asset management system 400, at block 640, terminates the communication session, or restores the wireless communication module 250 to a dormant state (or periodic state).

In each of the example operations described above, and below in FIGS. 7-10, steps, blocks, features, or aspects can be substituted or combined with other steps, blocks, features, or aspects, unless context warrants that such combinations or substitutions are not possible. Further, if a step, block, feature, or aspect is not described with respect to example operations, this does not mean that the feature, step, or aspect is incompatible or impossible with respect to those example operations. As such, the example operations of the present application described above and below are not necessarily limited to the steps, features, or aspects that are described with respect to those example operations.

Figure 7:
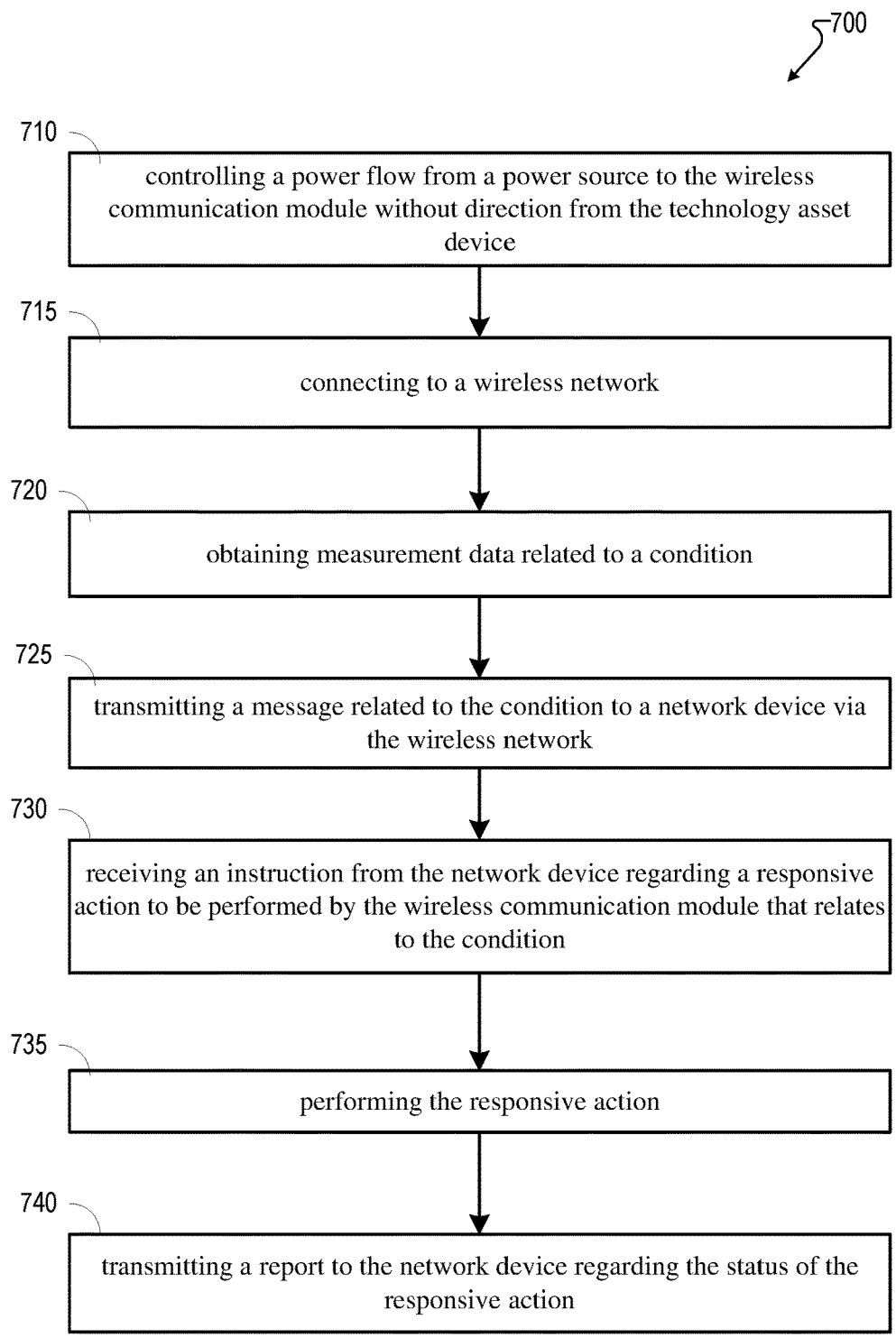
FIGS. 7-9 illustrate flow charts showing example operations that can be performed by the wireless communication module, in accordance with various aspects and example embodiments of the subject application.

FIG. 7 depicts example operations 700 that can be performed by a wireless communication module (e.g., wireless communication module 250) of a technology asset device (e.g., technology asset 102), the wireless communication module comprising a processor and a memory that stores executable instructions that, when executed by the processor, facilitate performance of example operations 700. The technology asset device can comprise an IoT device, or an IIoT device, examples of which were described above. The example operations at block 710 can comprise controlling a power flow from a power source (e.g., power source 230, battery of the technology asset, battery of the wireless communication module, power supply of the technology asset, power supply of the wireless communication module, etc.) to the wireless communication module without direction from the technology asset device (e.g., without the technology device controlling the power, such as controlled using the power controller module 220 or the operating system boot-up function module 215, or operating system of the technology asset).

At block 715, the example operations 700 can further comprise connecting to a wireless network (e.g., a wireless network that is part of the communication network 106).

The example operations 700 can further comprise, at block 720, obtaining measurement data related to a condition. The measurement data can be from a sensor, a camera, a meter (e.g., utility-related meter), GPS device, etc.) that is associated with the technology asset device. The condition can be any condition related to the operation or function of the technology asset device. For example, the condition might be an emergency condition, such as a power outage, flood, rise in a measurable (e.g., temperature) beyond or below a designated limit. The condition can relate to a shortage on an inventory count, low battery reading of the device (e.g., a battery life parameter that indicates that a charge stored by the power source is low), removal of the technology asset beyond a geo-fenced region (e.g., the condition results from a global positioning system (GPS) device indicating that a location of the technology asset device is outside a defined geographical region).

The example operations 700 can, at block 725, further comprise transmitting a message related to the condition to a network device (e.g., asset management system 400) via the wireless network.

The example operations 700 can further comprise, at block 730, receiving an instruction from the network device regarding a responsive action to be performed by the wireless communication module that relates to the condition. The responsive action can comprise, for example, sending, by the wireless communication module, a command to the technology asset device to change a power state (e.g., on/off) of the technology asset device, directing the technology asset device to wipe a memory associated with the technology asset device, facilitating generating a digital message for display on a screen of the technology asset device, facilitating emitting a light associated with the technology asset device, facilitating generating, by the wireless communication module, a sound associated with the technology asset device, etc.

At block 735, the example operations can further comprise, at block 735, performing, by the wireless communication module, the responsive action.

The example operations 700 can further comprise, at block 740, transmitting, by the wireless communication module, a report to the network device regarding the status of the responsive action (e.g., whether the responsive action has been completed, whether the condition has been addressed, etc.). Additionally, or alternatively, the report (or notification message) can be sent to an application server (e.g., technology asset application server 104, which can be, in the case of a technology asset device that is an IoT or IIoT device, and IoT application server, or a IIoT application server).

Additionally, in example embodiments, while various technology asset devices might be in the control of more than one owner entity (for example, PMU devices might be located throughout a power grid and owned by a power company, and moisture sensors might be located on an industrial-sized farm and owned by a farming entity), the wireless communication modules can be managed by one or more third party entities. This can allow the third-party entity to manage billing and service with telecommunications provider entities (e.g., multiple system operators (MSOs) and mobile network operators (MNOs)), including leveraging the volume of the wireless communication modules to obtain discounting cellular rates.

Figure 8:
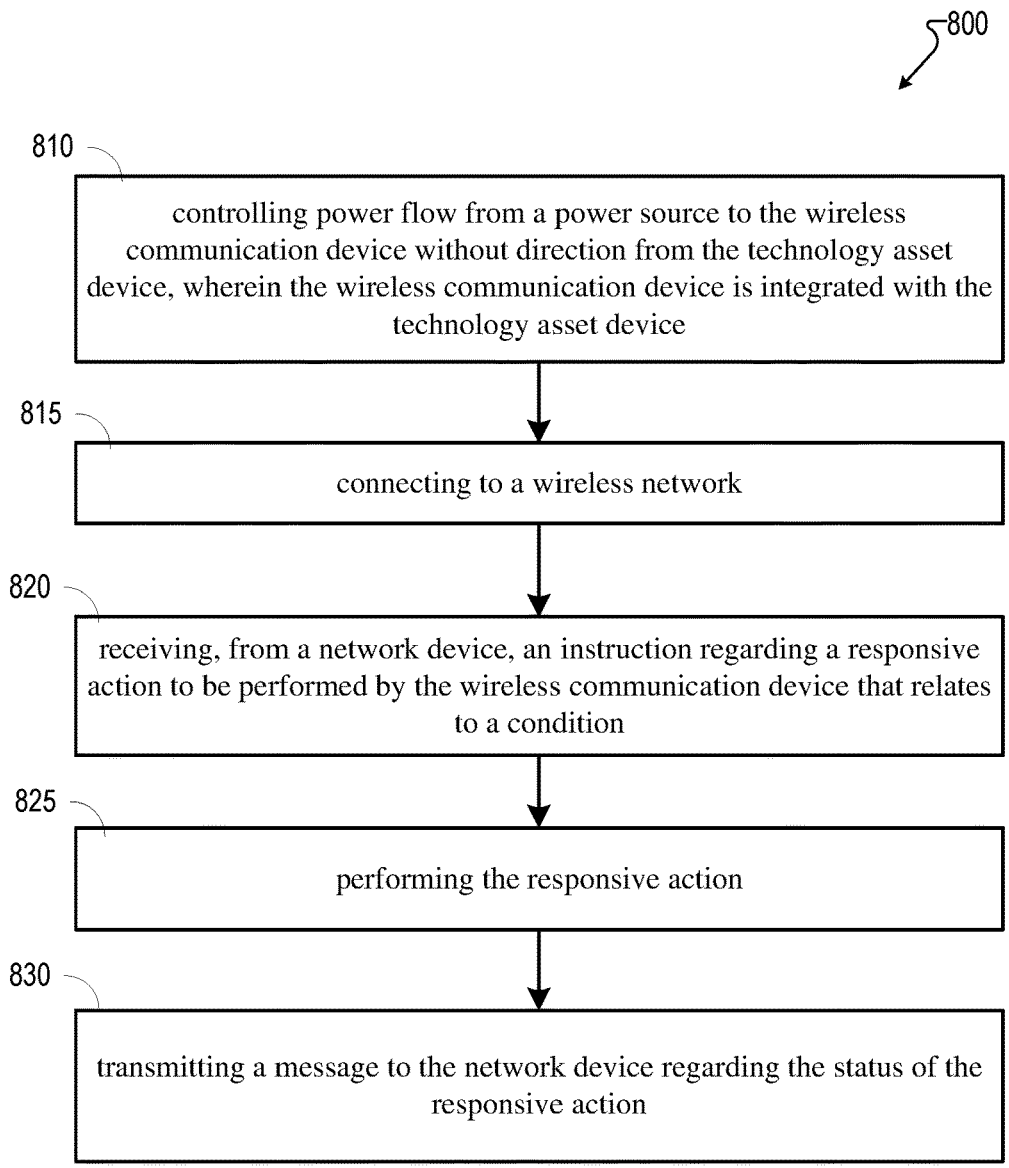

FIG. 8 depicts a flow diagram of example operations 800 that can be performed by a wireless communication device (e.g., wireless communication module 250) of a technology asset device, the wireless communication device comprising a processor and a memory that stores executable instructions that, when executed by the processor, facilitate performance of example operations 800. The technology asset device can comprise an IoT device, or an IIoT device, examples of which were described above.

The example operations at block 810 can comprise controlling power flow from a power source (e.g., power source 230, battery of the technology asset, battery of the wireless communication module, power supply of the technology asset, power supply of the wireless communication module, etc.) to the wireless communication device without direction from the technology asset device (e.g., without the technology device controlling the power, such as controlled using the power controller module 220 or the operating system boot-up function module 215, or operating system of the technology asset), wherein the wireless communication device is integrated with the technology asset device.

At block 815, the example operations can comprise connecting to a wireless network (e.g., wireless network that is part of communication network 106).

The example operations 800 can comprise, at block 820, receiving, from a network device (e.g., asset management system 400, technology asset application server 104, UE 108, etc.) an instruction regarding a responsive action to be performed by the wireless communication device that relates to a condition. For example, the condition might be an emergency condition, such as a power outage, flood, rise in a measurable (e.g., temperature) beyond or below a designated limit. The condition can relate to a shortage on an inventory count, low battery reading of the device (e.g., a battery life parameter that indicates that a charge stored by the power source is low), removal of the technology asset beyond a geo-fenced region (e.g., the condition results from a global positioning system (GPS) device indicating that a location of the technology asset device is outside a defined geographical region). The responsive action can comprise, for example, sending, by the wireless communication module, a command to the technology asset device to change a power state (e.g., on/off) of the technology asset device, directing the technology asset device to wipe a memory associated with the technology asset device, facilitating generating a digital message for display on a screen of the technology asset device, facilitating emitting a light associated with the technology asset device, facilitating generating, by the wireless communication module, a sound associated with the technology asset device, etc.

The example operations 800 can at block 825 comprise, performing the responsive action.

The example operations at block 800 can comprise, at block 830, transmitting a message to the network device regarding the status of the responsive action (e.g., whether the responsive action has been completed, whether the condition has been addressed, etc.). Additionally, or alternatively, the message (or notification message) can be sent to an application server (e.g., technology asset application server 104, which can be, in the case of a technology asset device that is an IoT or IIoT device, and IoT application server, or a IIoT application server).

Figure 9:
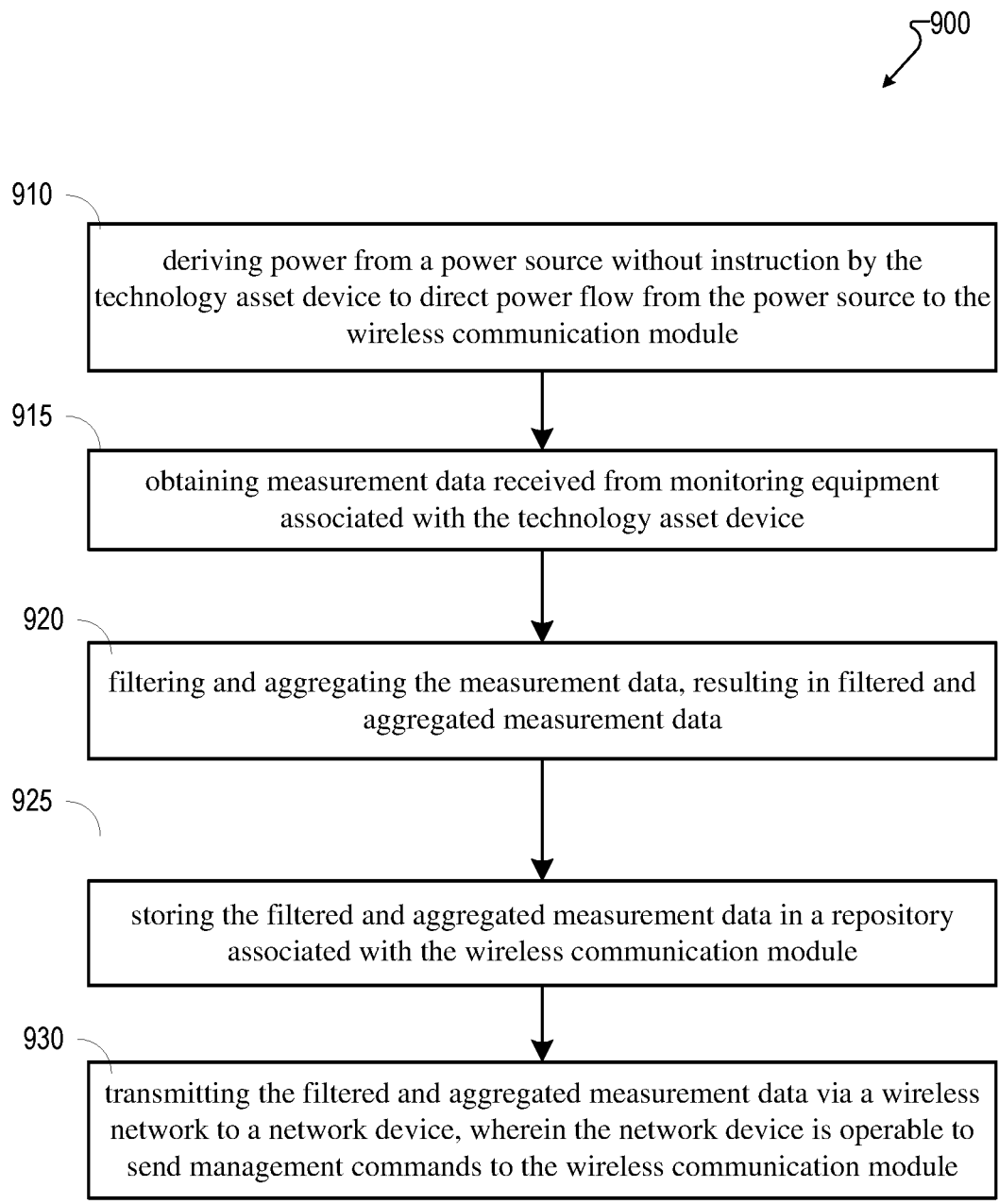

FIG. 9 depicts example operations 900 that can be performed by wireless communication module (e.g., wireless communication module 250) of a technology asset device (e.g., technology asset 102) comprising a processor and a memory that stores executable instructions that, when executed by the processor, facilitate performance of example operations 900.

The example operations 900 at block 910 can comprise deriving power from a power source (e.g., power source 230, battery of the technology asset, battery of the wireless communication module, power supply of the technology asset, power supply of the wireless communication module, etc.) without instruction by the technology asset device to direct power flow from the power source to the wireless communication module.

The example operations 900 can, at block 915, comprise obtaining measurement data received from monitoring equipment (sensors, cameras, readers, locators, measurement devices, etc.) associated with the technology asset device At block 920, the example operations 900 can comprise filtering and aggregating the measurement data, resulting in filtered and aggregated measurement data. As mentioned above, aggregating and filtering data can minimize data usage and save battery (or power usage) by the technology asset device.

The example operations 900 can, at block 925, comprise storing the filtered and aggregated measurement data in a repository associated with the wireless communication device. Storing the filtered and aggregated measurement data in a repository of the wireless communication module can make the data accessible for retrieval and transmission by the wireless communication module if the technology asset device is in an inactive state.

The example operations 900 can, at block 930, comprise transmitting the filtered and aggregated measurement data via a wireless network (e.g., a wireless network that is part of communication network 106) to a network device (e.g., asset management system 400), wherein the network device is operable to send management commands to the wireless communication module.

The wireless communication module can communicate with the network device of the wireless network during a period in which the technology asset device is in the inactive state, wherein the technology asset device draws less power from the power source in the inactive state than in an active state. The wireless communication module is operable to transmit a command to the technology asset device instructing the technology asset device to transition from the inactive state to the active state. The wireless communication module can receive messages from the network device to perform remote management functions related to the control of the technology asset device. The network device can also define rules related to responsive action to be taken based on a condition detected by the technology asset device. The operations can further comprise authenticating, by the wireless communication module, the technology asset device.

Figure 10:
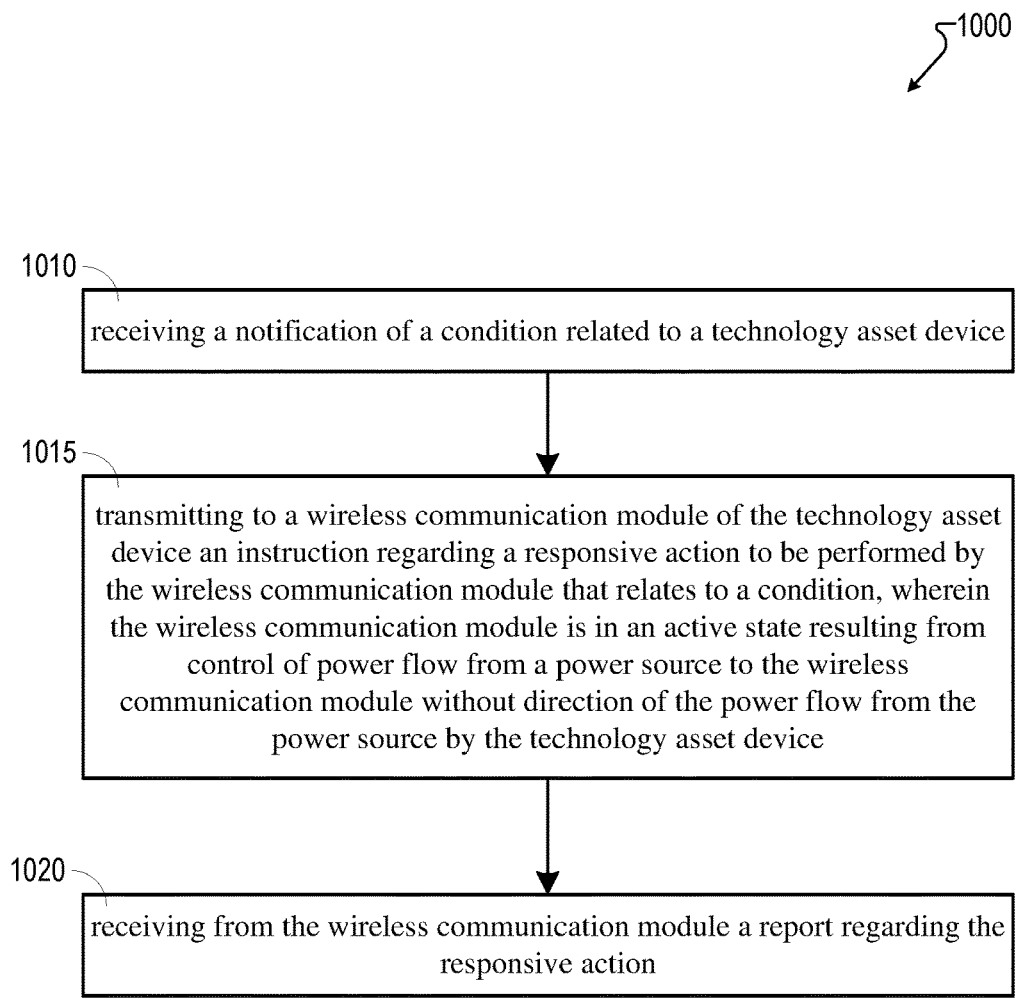
FIG. 10 is an illustration of a flow chart showing example operations that can be performed by the asset management system, in accordance with various aspects and example embodiments of the subject application.

FIG. 10 illustrates another diagram depicting example operations 1000 that can be performed by a network device (e.g., asset management system 400) comprising a processor and a memory that stores executable instructions that, when executed by the processor, facilitate performance of example operations 1000. The network device can comprise, for example, an application server, server device, or some other network computing device operable to perform the example operations 1000.

The example operations 1000 can comprise at block 1010 receiving a notification (e.g., from technology asset application server 104, UE 108, etc.) of a condition related to a technology asset device (e.g., technology asset 102). The technology asset device can comprise, for example, an IoT device, an IIoT device, as well as other computing devices. For example, the condition might be an emergency condition, such as a power outage, flood, rise in a measurable (e.g., temperature) beyond or below a designated limit. The condition can relate to a shortage on an inventory count, low battery reading of the device (e.g., a battery life parameter that indicates that a charge stored by a power source is low), removal of the technology asset beyond a geo-fenced region (e.g., the condition results from a global positioning system (GPS) device indicating that a location of the technology asset device is outside a defined geographical region).

At block 1015, the example operations 1000 can further comprise transmitting to a wireless communication module of the technology asset device an instruction regarding a responsive action to be performed by the wireless communication module that relates to a condition, wherein the wireless communication module is in an active state resulting from control of power flow from a power source (e.g., power source 230, battery of the technology asset, battery of the wireless communication module, power supply of the technology asset, power supply of the wireless communication module, etc.) to the wireless communication module without direction of the power flow from the power source by the technology asset device. The responsive action can comprise, for example, sending, by the wireless communication module, a command to the technology asset device to change a power state (e.g., on/off) of the technology asset device, directing the technology asset device to wipe a memory associated with the technology asset device, facilitating generating a digital message for display on a screen of the technology asset device, facilitating emitting a light associated with the technology asset device, facilitating generating, by the wireless communication module, a sound associated with the technology asset device, etc.

The example operations 1000 can comprise, at block 1020, receiving from the wireless communication module a report regarding the responsive action. The report can detail, for example, whether the responsive action was successful, or whether the condition was addressed, or whether the condition still exists, for example. The network device can forward the report to a technology asset application server device associated with the technology asset device. The network device of claim 21, wherein the operations further comprise, forwarding the report to a user equipment associated with the technology asset device. The network device can also transmit a command to the wireless communication module instructing the wireless communication module to transition from the active state to an inactive (e.g., dormant) state.

Figure 11:
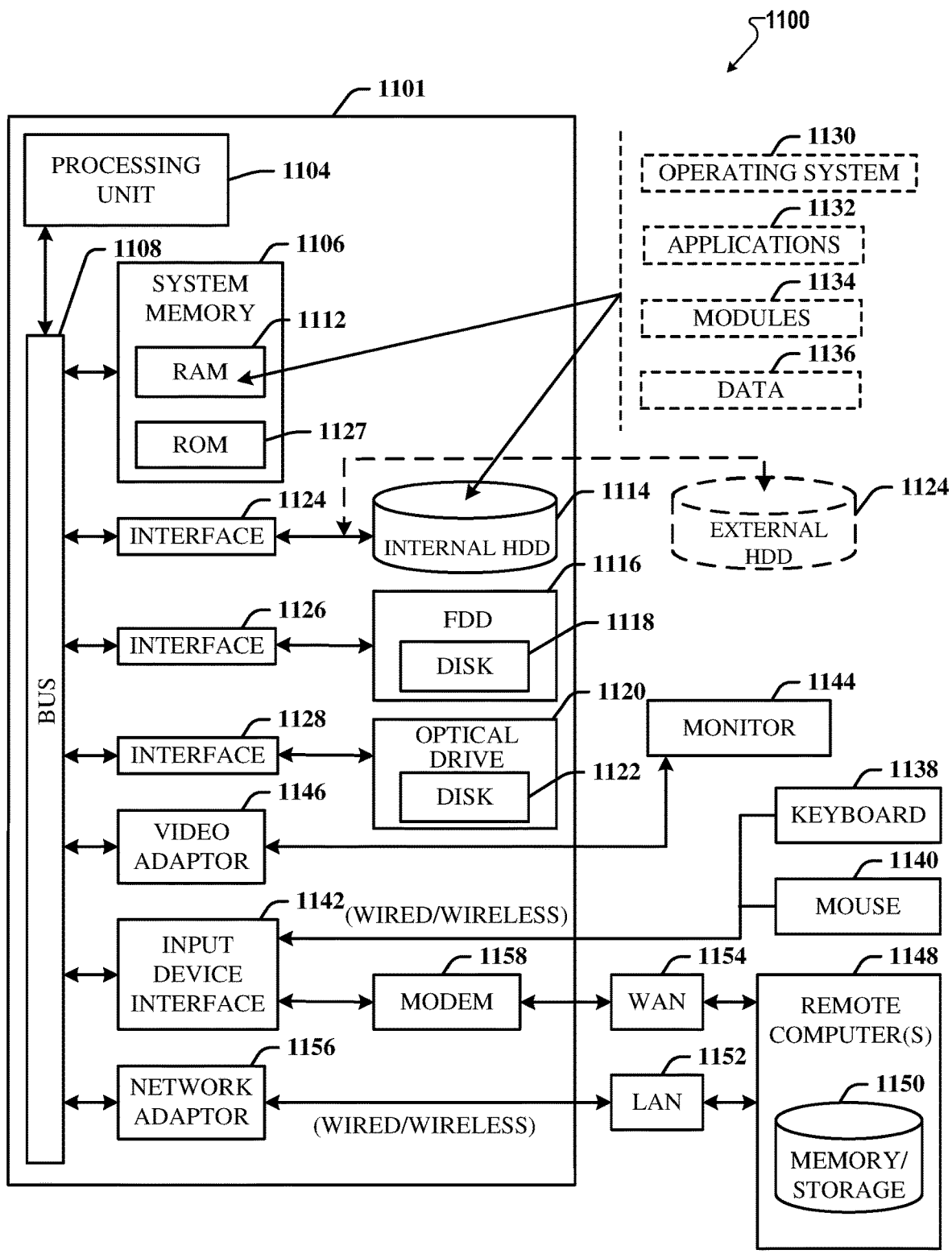
FIG. 11 illustrates a block diagram of an example computing device that can be operable to execute processes and methods, in accordance with various aspects and embodiments of the subject application.

Referring now to FIG. 11, there is illustrated a block diagram of a computer 1100 operable to execute the functions and operations performed in the described example embodiments by, for example, the asset management system 400, or the technology asset application server 104. The computer 1100 can provide networking and communication capabilities between a wired or wireless communication network and a server and/or communication device. In order to provide additional context for various aspects thereof, FIG. 11 and the following discussion are intended to provide a brief, general description of a suitable computing environment in which the various aspects of the embodiments can be implemented to facilitate the functions and operations described herein. While the description above is in the general context of computer-executable instructions that can run on one or more computers, those skilled in the art will recognize that the embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the embodiments can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 11, implementing various aspects described herein, devices can include a computer 1100, the computer 1100 comprising a processing unit 1104, a system memory 1106 and a system bus 1108. The system bus 1108 couples system components comprising the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 comprises read-only memory (ROM) 1127 and random-access memory (RAM) 1112. A basic input/output system (BIOS) is stored in a non-volatile memory 1127 such as ROM, EPROM, EEPROM, which BIOS contains the basic routines that help to transfer information between elements within the computer 1100, such as during start-up. The RAM 1112 can also include a high-speed RAM such as static RAM for caching data.

The computer 1100 further comprises an internal hard disk drive (HDD) 1114 (e.g., EIDE, SATA), which internal hard disk drive 1114 can also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The interface 1124 for external drive implementations comprises at least one or both of Universal Serial Bus (USB) and IEEE 1294 interface technologies. Other external drive connection technologies are within contemplation of the subject embodiments.

The drives and their associated computer-readable media provide nonvolatile storage of data, data structures, computer-executable instructions, and so forth. For the computer 1100 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1100, such as zip drives, magnetic cassettes, flash memory cards, cartridges, and the like, can also be used in the example operating environment, and further, that any such media can contain computer-executable instructions for performing the methods of the disclosed embodiments.

A number of program modules can be stored in the drives and RAM 1112, comprising an operating system 1130, one or more application programs 1132, other program modules 1134 and program data 1136. All or portions of the operating system, applications, modules, and/or data can also be cached in the RAM 1112. It is to be appreciated that the embodiments can be implemented with various commercially available operating systems or combinations of operating systems.

A user can enter commands and information into the computer 1100 through one or more wired/wireless input devices, e.g., a keyboard 1138 and a pointing device, such as a mouse 1140. Other input devices (not shown) can include a microphone, an IR remote control, a joystick, a game pad, a stylus pen, touch screen, or the like. These and other input devices are often connected to the processing unit 1104 through an input device interface 1142 that is coupled to the system bus 1108, but can be connected by other interfaces, such as a parallel port, an IEEE 2394 serial port, a game port, a USB port, an IR interface, etc.

A monitor 1144 or other type of display device is also connected to the system bus 1108 through an interface, such as a video adapter 1146. In addition to the monitor 1144, a computer 1100 typically comprises other peripheral output devices (not shown), such as speakers, printers, etc.

The computer 1100 can operate in a networked environment using logical connections by wired and/or wireless communications to one or more remote computers, such as a remote computer(s) 1148. The remote computer(s) 1148 can be a workstation, a server computer, a router, a personal computer, portable computer, microprocessor-based entertainment device, a peer device or other common network node, and typically comprises many, if not all of, the elements described relative to the computer, although, for purposes of brevity, only a memory/storage device 1150 is illustrated. The logical connections depicted include wired/wireless connectivity to a local area network (LAN) 1152 and/or larger networks, e.g., a wide area network (WAN) 1154. Such LAN and WAN networking environments are commonplace in offices and companies, and facilitate enterprise-wide computer networks, such as intranets, all of which can connect to a global communications network, e.g., the Internet.

When used in a LAN networking environment, the computer 1100 is connected to the local network 1152 through a wired and/or wireless communication network interface or adapter 1156. The adapter 1156 can facilitate wired or wireless communication to the LAN 1152, which can also include a wireless access point disposed thereon for communicating with the wireless adapter 1156.

When used in a WAN networking environment, the computer 1100 can include a modem 1158, or is connected to a communications server on the WAN 1154, or has other means for establishing communications over the WAN 1154, such as by way of the Internet. The modem 1158, which can be internal or external and a wired or wireless device, is connected to the system bus 1108 through the input device interface 1142. In a networked environment, program modules depicted relative to the computer, or portions thereof, can be stored in the remote memory/storage device 1150. It will be appreciated that the network connections shown are exemplary and other means of establishing a communications link between the computers can be used (e.g., Bluetooth).

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This comprises at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. These components also can execute from various computer readable storage media comprising various data structures stored thereon. The components can communicate via local and/or remote processes such as in accordance with a signal comprising one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. An interface can comprise input/output (I/O) components as well as associated processor, application, and/or API components.

Furthermore, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As it employed in the subject specification, the term "processor" can refer to substantially any computing processing unit or device comprising single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of UE. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (comprising a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprise a system as well as a computer-readable medium comprising computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary," where used, is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature can be combined with one or more other features of the other implementations as may be desired and advantageous for any given or particular application. Furthermore, to the extent that the terms "have", "having", "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art can recognize that other embodiments comprising modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A method, comprising:
   controlling, by a wireless communication device comprising a first processor and a memory, a technology asset device, a power flow from a power source to the wireless communication device, wherein the controlling the power flow is independent of a command provided by a second processor of a technology asset device that directs the power flow from the power source to the wireless communication device, wherein the wireless communication device is connected to the technology asset device;
   connecting, by the wireless communication device, to a wireless network;

obtaining, by the wireless communication device, measurement data related to a condition, wherein the measurement data is unrelated to the management of transmissions to extend the life of the power source supplying the power flow to the wireless communication device;

transmitting, by the wireless communication device, a message related to the condition to a network device via the wireless network;

receiving, by the wireless communication device, an instruction from the network device regarding a responsive action to be performed by the wireless communication device that relates to the condition;

performing, by the wireless communication device, the responsive action; and transmitting, by the wireless communication device, a report to the network device regarding the status of the responsive action.

2. The method of claim 1, wherein the condition relates to a function of a battery life parameter that indicates that a charge stored by the power source is low.

3. The method of claim 1, wherein the condition results from a global positioning system (GPS) device indicating that a location of the technology asset device is outside a defined geographical region.

4. The method of claim 1, wherein the responsive action comprises sending, by the wireless communication device, a command to the technology asset device to change a power state of the technology asset device.

5. The method of claim 1, wherein the responsive action comprises sending, by the wireless communication device, a command directing the technology asset device to wipe a memory associated with the technology asset device.

6. The method of claim 1, wherein the responsive action comprises facilitating generating, by the wireless communication device, a digital message for display on a screen of the technology asset device.

7. The method of claim 1, wherein the responsive action comprises facilitating emitting, by the wireless communication device, a light associated with the technology asset device.

8. The method of claim 1, wherein the responsive action comprises facilitating generating, by the wireless communication device, a sound associated with the technology asset device.

9. A wireless communication device, comprising:
a first processor; and
a memory that stores executable instructions that, when executed by the processor, facilitate performance of operations, comprising:
controlling power flow from a power source to the wireless communication device without direction from a second processor of a technology asset device, wherein the wireless communication device is integrated with the technology asset device;
connecting to a network device of a wireless network;
receiving, from the network device, an instruction regarding a responsive action that relates to a condition, wherein the responsive action is unrelated to the management of transmissions to extend the life of the power source supplying the power flow to the wireless communication device, the responsive action to be performed by the wireless communication device;
performing the responsive action; and
transmitting a message to the network device regarding the status of the responsive action.

10. The wireless communication device of claim 9, wherein the responsive action comprises sending a command to the technology asset device to change a power state of the technology asset device.

11. The wireless communication device of claim 9, wherein the memory is a first memory, and the responsive action comprises sending a command directing the technology asset device to wipe a second memory associated with the technology asset device.

12. The wireless communication device of claim 9, wherein the responsive action comprises generating a digital message for display on a screen of the technology asset device.

13. The wireless communication device of claim 9, wherein the responsive action comprises emitting a light associated with the technology asset device.

14. The wireless communication device of claim 9, wherein the responsive action comprises generating a sound associated with the technology asset device.

15. A non-transitory machine-readable storage medium, comprising executable instructions that, when executed by a processor inside a wireless communication device, facilitate performance of operations, comprising:
deriving power from a power source connected to a technology asset device independent of direction of the power to the wireless communication device by a second processor of the technology asset device;
obtaining measurement data received from monitoring equipment associated with the technology asset device, wherein the measurement data is unrelated to the management of transmissions to extend the life of the power source supplying the power to the wireless communication device;
filtering and aggregating the measurement data, resulting in filtered and aggregated measurement data;
storing the filtered and aggregated measurement data in a repository associated with the wireless communication device; and
transmitting the filtered and aggregated measurement data via a wireless network to a network device, wherein the network device is operable to send management commands to the wireless communication device.

16. The non-transitory machine-readable storage medium of claim 15, wherein the wireless communication device communicates with the network device of the wireless network during a period in which the technology asset device is in the inactive state, wherein the technology asset device draws less power from the power source in the inactive state than in an active state.

17. The non-transitory machine-readable storage medium of claim 16, wherein the wireless communication device is operable to transmit a command to the technology asset device instructing the technology asset device to transition from the inactive state to the active state.

18. The non-transitory machine-readable storage medium of claim 15, wherein the wireless communication device receives messages from the network device to perform remote management functions related to the control of the technology asset device.

19. The non-transitory machine-readable storage medium of claim 15, wherein the network device defines rules related to responsive action to be taken based on a condition detected by the technology asset device.

20. The non-transitory machine-readable storage medium of claim 15, further comprising: authenticating, by the wireless communication device, the technology asset device.

21. A network device, comprising:
a first processor; and
a memory that stores executable instructions that, when executed by the processor, facilitate performance of operations, comprising:
  receiving a notification of a condition related to a technology asset device comprising a second processor, wherein the notification is unrelated to the management of transmissions to extend the life of the power source supplying the power flow to a wireless communication device comprising a third processor, wherein the wireless communication device is connected to the technology asset device;
  transmitting to the wireless communication device an instruction regarding a responsive action to be performed by the wireless communication device that relates to a condition, wherein the wireless communication device is in an active state resulting from direction by the third processor of power flow from a power source to the wireless communication device without direction of the power flow by the second processor of the technology asset device;
  receiving from the wireless communication device a report regarding the responsive action.

22. The network device of claim 21, wherein the operations further comprise, forwarding the report to a technology asset application server device associated with the technology asset device.

23. The network device of claim 21, wherein the operations further comprise, forwarding the report to a user equipment associated with the technology asset device.

24. The network device of claim 21, further comprising, transmitting a command to the wireless communication device instructing the wireless communication device to transition from the active state to an inactive state.

* * * * *